(12) United States Patent
Witty

(10) Patent No.: US 9,743,583 B2
(45) Date of Patent: Aug. 29, 2017

(54) BLADE FOR MOWING APPARATUS AND METHOD OF SECURING A BLADE TO A MOWING APPARATUS

(71) Applicant: O-Sage Power Equipment LLC, Winnetka, IL (US)

(72) Inventor: Craig Witty, Winnetka, IL (US)

(73) Assignee: O-SAGE POWER EQUIPMENT LLC, Winnetka, IL (US)

( * ) Notice: Subject to any disclaimer, the term of this patent is extended or adjusted under 35 U.S.C. 154(b) by 188 days.

(21) Appl. No.: 14/749,199

(22) Filed: Jun. 24, 2015

(65) Prior Publication Data
US 2016/0374266 A1 Dec. 29, 2016

(51) Int. Cl.
A01D 34/42 (2006.01)
A01D 34/44 (2006.01)
A01D 34/53 (2006.01)
A01D 101/00 (2006.01)

(52) U.S. Cl.
CPC ............. *A01D 34/53* (2013.01); *A01D 34/42* (2013.01); *A01D 34/44* (2013.01); *A01D 2101/00* (2013.01)

(58) Field of Classification Search
USPC .......................................... 30/276, 329–344
See application file for complete search history.

(56) References Cited

U.S. PATENT DOCUMENTS

| | | | |
|---|---|---|---|
| 1,058,843 A | 4/1913 | Chapple | |
| 1,367,818 A * | 2/1921 | Kennedy | B21D 1/06 72/390.6 |
| 1,496,295 A * | 6/1924 | Chance | B26B 21/18 30/71 |
| 1,837,725 A | 12/1931 | Newton et al. | |
| 2,016,230 A | 10/1935 | Downing | |
| 2,029,498 A | 2/1936 | Newton | |
| 2,128,772 A * | 8/1938 | Green | B26B 21/18 30/73 |
| 2,189,434 A | 2/1940 | Newton | |

(Continued)

FOREIGN PATENT DOCUMENTS

DE 1482015 A1 3/1969
DE 1582403 A1 6/1970

(Continued)

*Primary Examiner* — Alicia Torres
(74) *Attorney, Agent, or Firm* — Greer Burns & Crain, Ltd.

(57) ABSTRACT

A method of securing a blade to an apparatus for cutting vegetation, wherein the apparatus includes a first and a second blade contacting structure. The method includes providing an elongated blade that is configured and arranged to be relatively flexible; and positioning the elongated blade between the first blade contacting structure and the second blade contacting structure such that the first blade contacting structure makes contact with a first surface of the elongated blade and the second blade contacting structure makes contact with a second surface of the elongated blade. The positioning step results in a plurality of bending forces being applied to the first and second surfaces of the elongated blade via the first and second blade contacting structures, thereby bending the elongated blade, and whereby the bending forces secure the elongated blade to the apparatus for cutting vegetation.

25 Claims, 13 Drawing Sheets

(56) References Cited

U.S. PATENT DOCUMENTS

| | | | | |
|---|---|---|---|---|
| 2,534,490 A | * | 12/1950 | Weeks | B26B 21/16 30/51 |
| 3,079,685 A | * | 3/1963 | Scully | B26B 21/185 30/346.61 |
| 4,236,312 A | * | 12/1980 | Foster | A01D 34/4162 30/276 |
| 6,207,294 B1 | * | 3/2001 | Rutter | B23K 20/08 228/165 |
| 7,386,974 B2 | | 6/2008 | Witty | |
| 7,562,516 B2 | | 7/2009 | Witty | |
| 8,661,775 B2 | | 3/2014 | Coffin | |
| 2009/0107199 A1 | * | 4/2009 | Li | B21D 5/08 72/212 |
| 2013/0269306 A1 | | 10/2013 | Gilpatrick et al. | |
| 2014/0230394 A1 | | 8/2014 | Zerbarini | |

FOREIGN PATENT DOCUMENTS

| | | |
|---|---|---|
| GB | 1134896 | 11/1968 |
| JP | 04028419 A * | 1/1992 |
| WO | WO8505532 A1 | 12/1985 |

* cited by examiner

BLADE FOR MOWING APPARATUS AND METHOD OF SECURING A BLADE TO A MOWING APPARATUS

BACKGROUND OF THE INVENTION

1. Field of the Invention

The present invention relates to mowing apparatuses. More specifically, the present invention relates to an apparatus for mowing lawn grass. Additionally, the present invention also relates to various embodiments of blades for the mowing apparatus, as well as to various methods and apparatuses for securing the blades to the mowing apparatus.

2. Description of the Related Art

Lawn mowers are well known devices used for cutting grass and commingled weed plants in order to maintain the appearance of an outdoor area such as a residential lawn or golf course. There are many types of lawn mowers, including rotary mowers and reel mowers. Additionally, many different cutting blades or cutter heads are known for use with lawn mowers and other plant cutting devices.

The gasoline-powered rotary mower is by far the dominant grass cutting mechanism on the market today. Less commonly, rotary mowers are powered by mains- or battery-operated electric motors. In the most familiar rotary configuration, a heavy steel blade with sharpened edges at opposing distal ends is spun at high speed around a central pivot point inside a cylindrical, open-bottomed chamber that is moved across the lawn. The blade is commonly shaped to create a zone of low air pressure above the grass in order to lift the individual shafts into the plane of the spinning blade. The power mower housing functions to prevent injury to the operator and to control the direction of discharge of the clippings generated during operation.

Different rotary cutting blade configurations are used for a variety of reasons. Burnell, in U.S. Pat. No. 5,019,113, discloses a rotary lawn mower assembly having easily detachable replacement blades. Mensing, in U.S. Pat. No. 4,532,708, discloses a blade assembly with a plurality of cutting segments arranged end to end for improved cutting. Knipe, in U.S. Pat. No. 3,964,243, shows a rotary cutting blade with detachable tines used to blow grass clippings from the mower's path.

Mullet, et al., in U.S. Pat. No. 4,916,887 discloses a rotary mulching mower using a multiplicity of cutting blades within the mower housing. Each cutting blade rotates through a different plane to cut the grass clippings into mulch. Geier, in U.S. Pat. No. 5,867,973, shows a single rotary blade consisting of multiple adjustable cutting edges to accomplish the mulching function.

Irrespective of the fact that rotary power mowers are ubiquitous, they have several significant drawbacks. The primary drawback associated with the rotary power mower is that a free-spinning steel blade is a relatively inefficient grass cutting instrument. Since a shaft of grass has little mass and can be easily deflected, the mower blade must be spun at very high power levels in order to adequately perform the cutting function. It is not uncommon to find standard rotary mower engines rated at six horsepower and above. As a consequence, in a gasoline-powered rotary mower the engine is large, noisy, creates significant air pollution, and uses relatively large amounts of energy per blade of grass cut. It was estimated in 2003 by William A. Burke, Chairman of the California South Coast Air Quality Management District, that an older gas-powered lawn mower pollutes as much in one year of typical use as a new car driven more than 86,000 miles.

Electric rotary mowers generate lower levels of noise and no (local) air pollution, but suffer from the same inherent cutting inefficiencies. As a result, they tend to be heavy and expensive due to the large battery capacity needed to generate the required inertial cutting forces.

Regardless of the power source, because the blade of the rotary mower is essentially a sharpened, if not always sharp, flail, the cut edge at the top of the living shaft of grass is often torn or ragged. A ragged grass cut is undesirable, both in terms of the appearance of the lawn and for the health of the grass. In sandy or debris-strewn soil, blades spinning at high speed erode quickly and require frequent sharpening or replacement.

Another disadvantage presented by a conventional rotary mower is the inherent danger of unintended contact with the high-speed blade. The blade is a direct threat if the user comes in contact with it, and an indirect threat if it propels an object from the housing. Grievous injuries have been sustained by both experienced and inexperienced users of rotary power mowers due to both of these conditions.

Tall grass presents another problem for conventional rotary mowers. The tendency is for tall grass to be flattened as the mower housing passes over. If the grass is very long, the housing will hold it to the ground so that it is not effectively cut.

It is believed that no current rotary lawn mowing device sufficiently addresses these problems.

Another common, and historically very significant, grass cutting mechanism is the reel mower. This device is typically constructed with a set of four to ten heavy steel blades fixed in a cylindrical form and rotated about the axis of the cylinder parallel to the ground and perpendicular to the direction of travel of the mower. The blades are generally twisted in a helical form, and positioned to graze the leading edge of a horizontal bed knife suspended at the desired cutting distance above the ground. As the mower is pushed forward, the blades of grass are swept against the bed knife and sheared between the knife and the passing helical blade. In the past, such reel mowers have been powered by both gasoline and electric motors, but the most common configuration, historically and at the present, is the human-powered "push mower."

Compared to rotary mowers, revolving blade reel mowers have a great advantage in terms of cutting efficiency. The bed knife and revolving helical blades interact to create a 'scissors' action that is not only energy efficient as a cutting mechanism, but which also creates a clean cut at the top of the living shaft of grass. Lawns that are routinely cut with reel mowers, such as is commonly the practice at many golf courses, have a groomed appearance that is generally considered superior to lawns cut with rotary mowers. There is also a consequent improving effect on the health of the grass.

There have been numerous variations in the design of the basic reel mower. Many deal with the need to accurately preserve the gap between the bed knife and the revolving blades in order to maintain efficient cutting action. Rickheim, in U.S. Pat. No. 6,618,925, discloses a method of constructing a bed knife assembly that restricts the movement of the bed knife blade relative to a clamp plate. Bokon, in U.S. Pat. No. 4,563,867, shows a rotary cutter that consists of concentric circular cutting discs rather than a reel-type bale. Chandler, in U.S. Pat. No. 4,345,419, discloses a self-adjusting, floating reel blade mower, as does Beusink et al. in U.S. Pat. No. 3,863,429. Crotty, in U.S. Pat. No. 2,790,293, discloses a cutting mechanism consisting of rotating flanged discs in cooperation with a toothed stationary cutter bar.

Compared to the single freely rotating solid steel blade of the rotary mower, the cutting device of the reel mower is complex and expensive to produce. It is not uncommon for a powered reel mower of the sort used by golf courses to cost several thousand dollars. The need to preserve a precise gap between the reel and the bed knife is a disadvantage of the reel type mower relative to the rotary mower, since it generally requires that the mechanism be constructed of heavy-gauge, rigid materials that are capable of maintaining proper alignment throughout long-term use.

Designs have been disclosed for revolving blade cutters without an associated bed knife. Postlewait et al. in U.S. Pat. No. 3,068,632 shows a design that consists of two long thin blades affixed to the sides of a spinning horizontal roller. Another design, disclosed by Newton et al. in U.S. Pat. No. 1,837,725, shows two resilient metal blades connected to an axle, and "revolved by the rotation thereof to cut grass, the cutting being accomplished entirely by the revolving blades." The drawback inherent in both of these 'bed knife-free' designs is the same as found in the rotary mower; namely, the relative inefficiency of cutting low mass materials such as shafts of grass with purely inertial forces.

Abbrecht, in U.S. Pat. No. 2,449,042, discloses a mechanism that substitutes elongated brushes for the helical blades in the reel. The brushes provide a compliant means of sweeping the grass against the bed knife, and Abbrecht claimed more efficient, as well as quieter operation for this mechanism relative to a steel-bladed reel. The results of any attempts to reduce this design to practice are unknown.

In addition to complexity and cost, reel-type mower mechanisms suffer from another important disadvantage compared to rotary power mowers. The reel/bed knife mechanism is incapable, by itself, of mulching grass. The bed knife is set at a fixed distance to the ground and the reel sweeps each blade of grass against the bed knife only once as the mower passes. Unless a lawn is cut very frequently, any mowing system that does not mulch the cut grass generally requires that the clippings be removed for aesthetic reasons. This creates an additional task for the operator (either raking the lawn or emptying a clippings catcher), and more importantly for the health of the grass, deprives the lawn of valuable nutrients. It also creates a burden for the local municipality if the clippings are hauled away to a landfill. The practice of disposing of grass clippings, rather than mulching them, is therefore counterproductive in a compound way.

Various means have been devised for reel mowers to redirect cut pieces of grass back into the zone of the bed knife in order to be re-cut. Smith, in U.S. Pat. No. 5,400,576, discloses a mulching device for powered reel-type lawn mowers. Aske, in U.S. Pat. No. 2,599,883, discloses a clipping guide for push mowers that is meant to accomplish this task, as do Williams in U.S. Pat. No. 2,685,775, and Elliott and Johnston in U.S. Pat. No. 2,517,184. All four of these disclosures describe a cover or cowling of some sort that is intended to passively channel clippings back to the cutting zone. Perhaps because the mechanisms are passive, there is a tendency for them to become clogged, and for the re-cutting process to be haphazard.

Force, in U.S. Pat. No. 2,759,321, discloses a combined mower and mulch machine with multiple swinging blades arranged along a horizontal shaft in a manner that is superficially similar to a reel mower. The grass is cut purely by inertial forces, however, and this design suffers the same disadvantages as a powered rotary mower.

No current lawn cutting device based on the design of a reel mower is known to exist that sufficiently addresses the problem of the complexity and cost required to maintain an accurate gap between the reel and the bed knife, nor does any known design embody an intrinsic and efficient mulching function.

A few other basic cutting mechanisms have been applied to lawn mowing. One of the more successful designs entails the use of a reciprocating toothed blade in cooperation with a fixed toothed bar, in a manner similar to a hedge trimmer. Wood, in U.S. Pat. No. 468,075, discloses such a device designed to be manually operated. The Allen Scythe, produced in England from the 1930s, used a similar mechanism powered by a gasoline engine. Updated versions of the basic design are available in various models of the AL-KO Scythe Bar Mower, but their popularity seems to be largely limited to the UK, Australia, and New Zealand. This may be because the machines tend to create significant vibrations and are considered somewhat unwieldy. The exposed cutting zone at the front of the machine also represents a safety concern. These designs are also devoid of an effective mulching function.

Implements with rotating or revolving blades have been designed and used for cutting forms of vegetation much larger than grass. Rostoucher et al., in U.S. Pat. No. 6,543,210 discloses a cutting mechanism consisting of a rotor equipped with knives in recessed pockets that can be hitched to a tractor. O'Hagan, in U.S. Pat. No. 6,321,518, discloses a tubular rotor containing a plurality of swinging blades. Flail mechanisms such as these can be very effective in clearing ground of shrubs and small trees, but tend to be overkill when the task consists of removing undergrowth, rank grasses, and weeds.

Campion, in U.S. Pat. No. 1,992,119, discloses a cutting device for a lawn mower that is comprised of a pair of counter-revolving cutters that interact so that the cutting action takes place regardless of whether the mower is moved forwards or rearwards. The axes of the paired cutters, which take the form of close-tolerance nested reels, are eccentric, and the revolving cutters are active "only at the cutting plane and effective for a shearing action." As a consequence, this is not a design that embodies a mulching function.

In U.S. Pat. No. 2,777,274, Beaumont describes a mower mechanism in which a shearing bar is positioned inside a revolving cutter drum. The shearing bar is mounted "in a substantially fixed position and does not rotate with the drum" and is "mated to the inner surface of the cylindrical drum and held substantially at the height to which the vegetation is to be trimmed so that rotation of the drum forces the grass or other vegetation against the shearing bar, whereby it is trimmed off." Because the shear bar in Beaumont's design is mounted in a fixed position at the cutting height, the device is incapable of providing a mulching function.

Edwards, in U.S. Pat. No. 2,309,635, discloses a hybrid grass-cutting, hedge-trimming device which consists of concentric nested counter-rotating helical cutters which in theory is capable of performing a mulching function. In order to perform this function, however, the relative positions of the rigid cutting elements must be maintained within very precise tolerances in relation to each other. Since the cutting elements are concentric, the cutting action takes place around the entire circumference of the cutting head. In as much as 360° cutting is not a requirement for cutting grass, the rigidity and tight tolerances required of such a system, as well as the energy requirement to overcome friction between the cutting blades around the entire circumference, are drawbacks in the context of a device devoted to cutting grass.

The prior art fails to provide a vegetation cutting mechanism that combines the efficiency of metal-blade shearing action with an inherent mulching function in a device of relatively low mechanical complexity, light weight, and optimized energy efficiency.

It would also be helpful to provide an improved blade structure, an improved blade holding mechanism, and an improved method of securing the blades within the cutting mechanism.

BRIEF SUMMARY OF THE INVENTION

One aspect of the present invention is an apparatus for cutting vegetation. The apparatus includes a reel mechanism and a cutting mechanism. The reel mechanism includes a plurality of reel bars, and the reel mechanism rotates about a first central axis in a first direction. The cutting mechanism includes a plurality of cutting blades. The cutting mechanism rotates about a second central axis in a second direction opposite of the rotation of the first direction. In certain embodiments, the cutting mechanism is disposed eccentric to the reel mechanism, while in other embodiments the cutting mechanism is disposed in a concentric manner with respect to the reel mechanism. In both types of devices, vegetation is cut between the reel bars and blades by resilient sliding contact.

Another aspect of the present invention is an apparatus for cutting vegetation. The apparatus includes a reel mechanism and a cutting mechanism. The reel mechanism includes a plurality of reel bars. The reel mechanism rotates about a first central axis in a first direction. The cutting mechanism includes a plurality of cutting blades. The cutting mechanism rotates about a second central axis in a second direction opposite of the rotation of the first direction. In certain embodiments, the cutting mechanism is positioned eccentric to the reel mechanism wherein the first central axis is offset from the second central axis by a distance less than 10% of the diameter of a reel mechanism. The reel mechanism and the cutting mechanism are configured to have at least one cutting blade of the plurality of cutting blades make resilient sliding contact with at least one reel bar of the plurality of reel bars during the rotation of the cutting mechanism about the second central axis such that vegetation is cut at a section of a rotary path of the reel mechanism that is greater than 10% of a circumference of the rotary path.

Each of the plurality of cutting blades is preferably oriented at an angle ninety degrees or less relative to a tangent of a cylinder defined by the rotational translation through space of the innermost extent of each of the plurality of reel bars, with the angle being measured on the forward-moving side of the cutting blade.

Each of the plurality of cutting blades is straight and each of the plurality of reel bars is helical. Alternatively, each of the plurality of cutting blades is helical and each of the plurality of reel bars is straight.

The number of reel bars is preferably greater than the number of cutting blades. Alternatively, the number of reel bars is less than the number of cutting blades, or the same.

Each of the plurality of cutting blades is preferably composed of a metal material, a plastic material, a composite material, or a number of individual fibers or filaments.

Each of the plurality of reel bars is preferably manufactured to provide a cutting edge at the surface of the cylinder defined by the rotational translation through space of the innermost extent of each of the plurality of reel bars.

Another aspect of the invention relates to a method of securing a blade to an apparatus for cutting vegetation, wherein the apparatus includes a first blade contacting structure and a second blade contacting structure. The method includes providing an elongated blade, wherein the elongated blade is configured and arranged to be relatively flexible; and positioning the elongated blade between the first blade contacting structure and the second blade contacting structure such that the first blade contacting structure makes contact with a first surface of the elongated blade and the second blade contacting structure makes contact with a second surface of the elongated blade. The first surface of the elongated blade and the second surface of the elongated blade face in opposite directions from each other. Also, the positioning step results in a plurality of bending forces being applied to the first and second surfaces of the elongated blade via the first and second blade contacting structures, thereby bending the elongated blade such that the first surface of the elongated blade is transformed into a concave surface and the second surface of the elongated blade is transformed into a convex surface, and whereby the bending forces secure the elongated blade to the apparatus for cutting vegetation.

In certain embodiments, the first blade contacting structure includes a first elongated roller extending in an axial direction between a first axial end and a second axial end, and the elongated blade includes first and second side edges that each extend axially between a first axial edge and a second axial edge, and the first elongated roller and the elongated blade extend parallel to each other, in the axial direction.

In some embodiments, the second blade contacting structure includes a second elongated roller extending in an axial direction between axial ends thereof and a third elongated roller extending in the axial direction between axial ends thereof, and the second elongated roller, the third elongated roller, and the elongated blade all extend parallel to each other, in the axial direction.

While in certain other embodiments, the second blade contacting structure includes a curved plate extending in an axial direction between axial ends thereof, where the curved plate and the elongated blade extend parallel to each other, in the axial direction. Preferably, the curved plate includes at least one first elastomeric member and at least one second elastomeric member, wherein the first and second elastomeric members are configured and arranged to make contact with first and second positions, respectively, on the second surface of the elongated blade.

Other aspects of the present invention relate to various configurations for orienting the elongated blade upon the first elongated roller, such as by: (i) inserting each of a plurality of spaced projections that each extend radially outwardly from the first elongated roller into an associated one of plurality of through holes that are formed within the elongated blade; (ii) aligning a pair of spaced projections that each extend radially outwardly from the first elongated roller with an associated pair of notches formed in the first and second axial edges of the elongated blade; (iii) aligning each of a plurality of spaced projections that each extend radially outwardly from the first elongated roller with an associated one of plurality of dimples that are formed within the elongated blade; or (iv) aligning a single elongated axial projection that extends outwardly from the first surface of the blade with a groove formed within the first elongated roller.

Other aspects of the invention relate to a blade for a mowing apparatus, where the blade includes a thin, flexible sheet of material that defines first and second side edges that extend between first and second axial edges, and that further defines a generally rectangular first face and a generally rectangular second face, wherein the first and second faces are disposed to face in opposite directions. The sheet is preferably configured and arranged to be secured within a first blade contacting means of the mowing apparatus and a second blade contacting means of the mowing apparatus. The sheet is further configured and arranged such that, upon simultaneous application of at least one first contact force upon the first face from the first blade contacting means and at least two second contact forces upon the second face from the second blade contacting means, the sheet is transformed from a first state to a second state, wherein in the first state, the first and second faces of the sheet are substantially planar and wherein in the second state, the first face is generally concave and the second face is generally convex.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
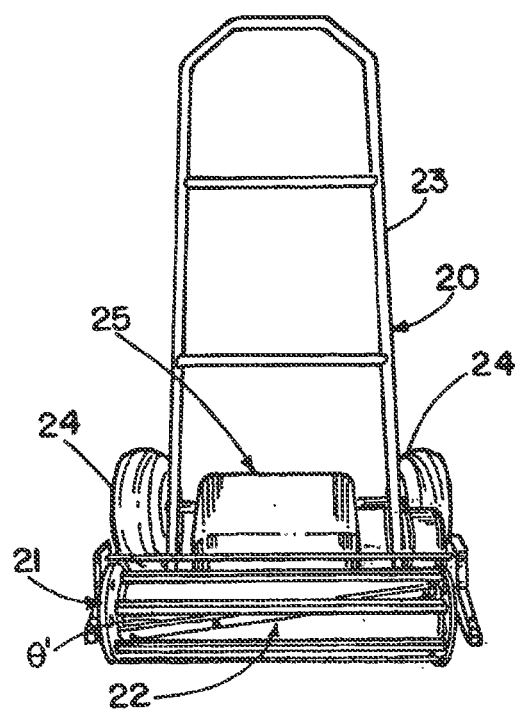
FIG. 1 is a front perspective view of a preferred embodiment of an apparatus of the present invention.
Figure 2:
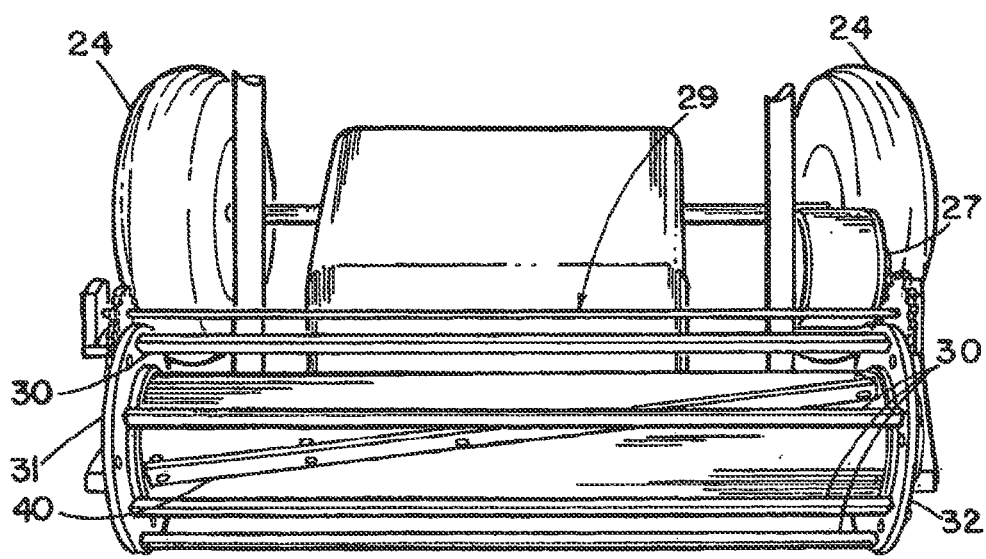
FIG. 2 is an isolated enlarged view of the apparatus of FIG. 1.
Figure 3:
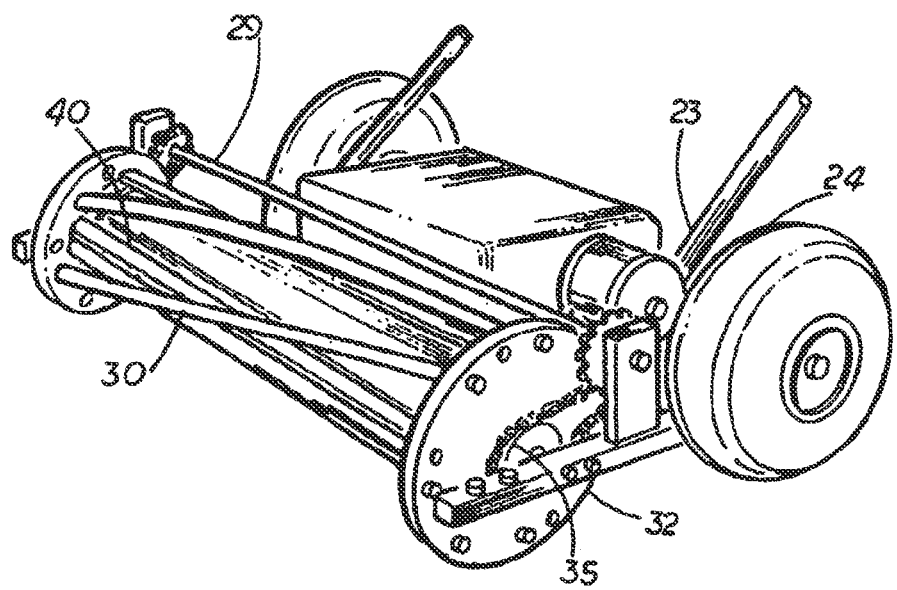
FIG. 3 is an isolated side perspective view of the apparatus of FIG. 1.
Figure 4:
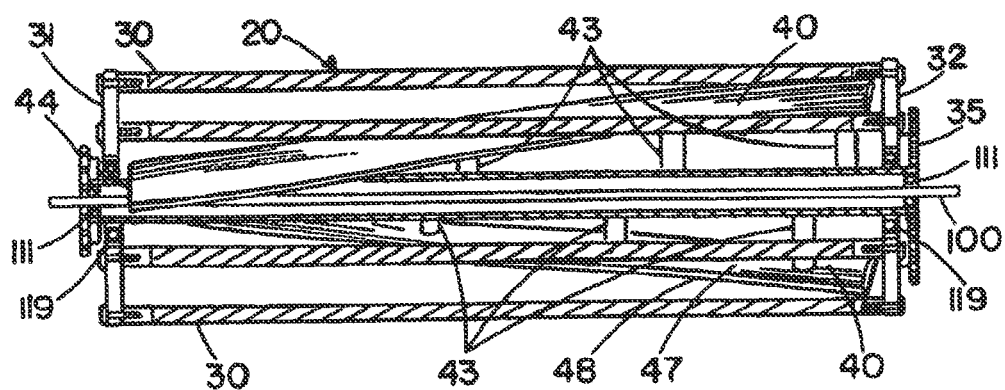
FIG. 4 is an isolated front view of a preferred embodiment of the reel mechanism and cutting mechanism of the apparatus of the present invention.

As shown in FIGS. 1-5, an apparatus of the present invention is generally designated 20. The apparatus 20 includes a reel mechanism 21 and a cutting mechanism 22. The apparatus 20 also preferably includes a frame assembly 23, a transport mechanism 24 and a power source 25. The reel mechanism 21 preferably includes a plurality of reel bars 30 which are preferably sequentially positioned equidistant about a central axis xR. In a preferred embodiment, the number of plurality of reel bars 30 ranges from 3 to 20, more preferably from 5 to 10 and most preferably 7. Each of the plurality of reel bars 30 is preferably composed of a metal alloy such as a steel alloy or titanium alloy. Each of the plurality of reel bars 30 has a first end 30a and a second end 30b. The plurality of reel bars 30 preferably rotates about the central axis xR in a clockwise rotation when viewed from a left end of the apparatus 20 as the observer faces the front of the apparatus.

In a preferred embodiment, the reel mechanism 21 also includes a first end plate 31 and a second end plate 32. Each of the end plates 31 and 32 has a perimeter region 33 and a center region 34. Each of the plurality of reel bars 30 is connected at the first end 30a to the perimeter region 33 of the first end plate 31 and at the second end 30b to the perimeter region 33 of the second end plate 32. Each of the reel bars 30 is preferably helically curved to conform to the surface of a cylinder described by the space contained between the endplates 31 and 32 at the perimeter region 33. The reel mechanism 21 also preferably includes a power transmission component 35 for delivering rotational movement to the reel mechanism 21. The power transmission component 35 is preferably a gear, a friction wheel, a cog belt pulley or a chain sprocket. However, those skilled in the pertinent art will recognize other devices that may be utilized for the power transmission component 35 without departing from the scope and spirit of the present invention.

The cutting mechanism 22 preferably includes a plurality of cutting blades 40 which are preferably positioned about a central axis xB. In a preferred embodiment, the number of plurality of cutting blades 40 ranges from 1 to 10, more preferably from 2 to 5 and most preferably 2. Each of the plurality of cutting blades 40 is preferably composed of a relatively flexible metal alloy such as spring steel or titanium alloy. Each of the plurality of cutting blades 40 is preferably straight having a first end 40a and a second end 40b. The plurality of cutting blades 40 preferably rotate about the central axis xB in a counter-clockwise rotation when viewed from a left end of the apparatus 20 by a viewer facing the front of the apparatus.

In a preferred embodiment, the cutting mechanism 22 includes a main axle 100, a plurality of radial arms 43 extending outward from the main axle 100, and a power transmission component 44 for providing rotational movement to the cutting mechanism 22. Each of the plurality of radial arms 43 has a first end 45 and a second end 46. The first end 45 is connected to the main axle 100 and the second end 46 provides a platform for attachment of a cutting blade 40.

In a preferred embodiment, a blade 40 is attached directly to the second end 46 of each of the plurality of radial arms 43. In another preferred embodiment, a blade attachment member 47 is connected to the second end 46 of each of the plurality of radial arms 43, and a cutting blade 40 is connected to the blade attachment member 47. In an even more preferred embodiment, an elastomer member 48 is connected to the blade attachment member 47 and a cutting blade 40 is connected to the elastomer member 48. Further, in another preferred embodiment, a removable attachment member 49 is attached to the elastomer member 48 and a cutting blade 40 is connected to the removable attachment member 49. Alternatively, the removable attachment member 49 is attached to the second end 46 of each of the plurality of radial arms 43 and a cutting blade 40 is connected to the removable attachment member 49.

In a preferred embodiment, each of the plurality of cutting blades 40 has a leading edge 50. The leading edge 50 engages an innermost surface 59 of each of the plurality of reel bars 30 to cut the vegetation, as explained in greater detail below.

Figure 7:
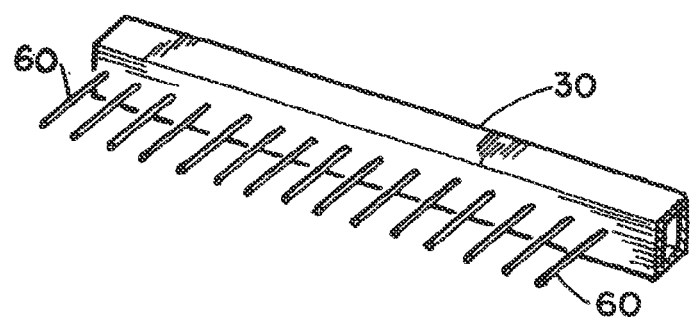
FIG. 7 is an isolated view of a reel bar with tines.

As shown in FIG. 7, in an alternative embodiment, each of the plurality of reel bars 30 has a plurality of tines 60 extending outward to enhance the lifting of vegetation during operation. Each of the tines 60 is preferably an elongated cylindrical rod having a length ranging from 1.0 inches to 3.0 inches.

The frame assembly 23 preferably provides support for the reel mechanism 21, the cutting mechanism 22, the transport mechanism 24 and the power source 25. In a preferred embodiment, the reel mechanism 21 and the cutting mechanism 22 are positioned forward of the transport mechanism 24 and the power source 25. The power source 25 preferably includes a battery, not shown, a motor 27 and a power transmission component 29. The power source 25 provides the rotational movement for the apparatus 20. This rotational movement is preferably provided by any convenient source, including a ground-contacting friction wheel of the transport mechanism 24, a gasoline or diesel engine, a mains-powered electric motor, a battery-powered electric motor, or other similar motive source.

The frame assembly 23 preferably includes a plurality of bearings 111 which support the ends of the main axle 100 for attachment of the cutting mechanism 22 thereto. Also, the main axle 100 defines a central axis xB relative to which the axis xR of the reel mechanism 21 is offset by a distance xG. The direction of the offset of the reel mechanism 21 is rearward in relation to the front of the mower and upward in relation to the ground. The axle 100 is preferably oriented at an appropriate height parallel to the ground and perpendicular to the direction of motion of the cutting mechanism 22. The power transmission component 44 is preferably affixed to at least one end of the main axle 100 which is preferably designed to extend in the axial direction past bearing 111. Rotational movement is preferably applied to the power transmission component 44 by a matching power transmission component, such as a cog belt, gear, friction wheel or sprocket chain, to rotate the main axle 100 at a relatively high speed counter to the direction of the ground-contacting wheels of the transport mechanism 24.

A plurality of bearings 119 with a relatively large inside diameter are concentrically affixed to the first and second endplates 31 and 32 at the center regions 34. The reel bars 30 are attached to the perimeter regions 33 of the first and second endplates 31 and 32 by conventional attachment means such as bolts. Each bearing support 90 fits within the inside diameter of bearing 119 and is affixed to the frame assemble 23. The diameter of the bearing supports 90 is sufficient to enclose the main axle 100 and the bearings 111 which are offset from the center of rotation of the bearings 119 by the distance xG, and leave sufficient space for the physical attachment of bearing supports 90 to the frame assembly 23 with conventional attachment means such as bolts. The bearings 111 may be housed directly in the bearing supports 90 or in the frame assembly 23, in which case the main axle 100 passes freely through a suitably sized aperture in the bearing supports 90. The power transmission component 35 (such as a cog belt pulley, gear, friction wheel or chain sprocket) is affixed to at least one of the first and second endplates 31 and 32. Rotational energy is applied to the power transmission component 35 by a matching power transmission component such as a cog belt, gear, friction wheel or sprocket chain so that the reel mechanism 21 revolves around the axis of the main axle 100 eccentrically, with the eccentric offset distance xG, in the same direction as the ground-contacting wheels of the external transport means 24.

In a preferred embodiment, the power transmission component 44 is preferably affixed to the main axle 100 and the power transmission component 35 is affixed to the second end plate 32 at opposite ends of the cutting mechanism 22. It is equally possible, however, to place power transmission components 35 and 44 at the same end of the cutting mechanism 22, provided only that the power transmission component 35 attached to the second endplate 32 is of a larger diameter than the power transmission component 44, and that the power transmission component 44 attached to the main axle 100 is offset along the long axis of the cutting mechanism 22 sufficiently to allow the power transmission component 35 to make unimpeded contact with an external source of motive power.

In a like manner, it is also possible to affix a power transmission component 44 to both ends of the main axle 100, and to simultaneously affix a power transmission component 35 to both first and second endplates 31 and 32, provided only that power transmission components 35 attached to the first and second endplates 31 and 32 are of a larger diameter than the power transmission components 44, and that the power transmission components 44 are spaced widely enough apart on axle 100 to allow unimpeded access to an external source of motive power.

Figure 5:
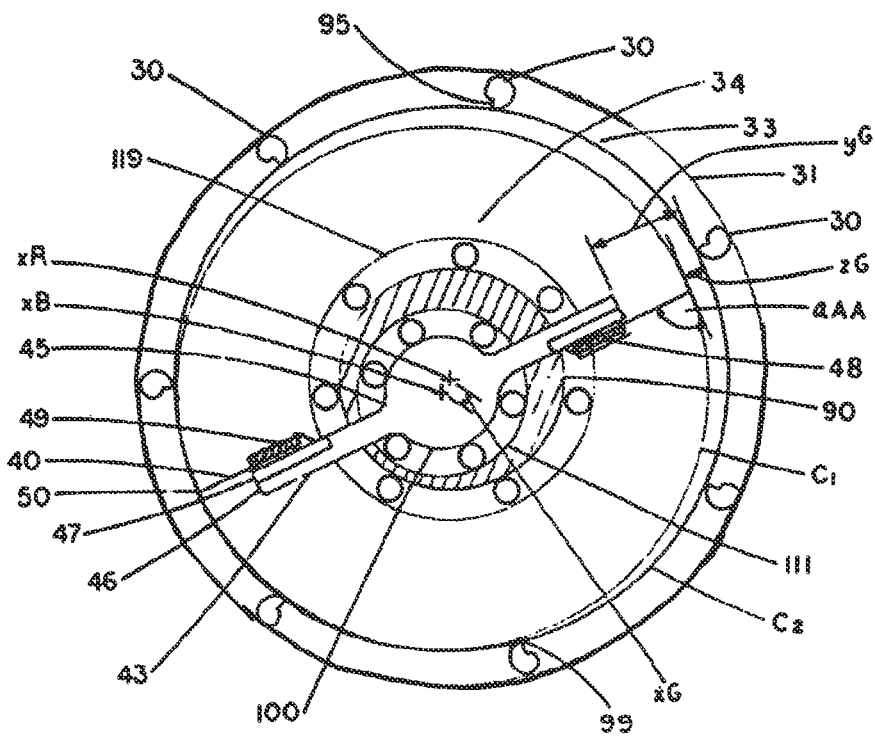
FIG. 5 is a cross-sectional view of FIG. 4.
Figure 6:
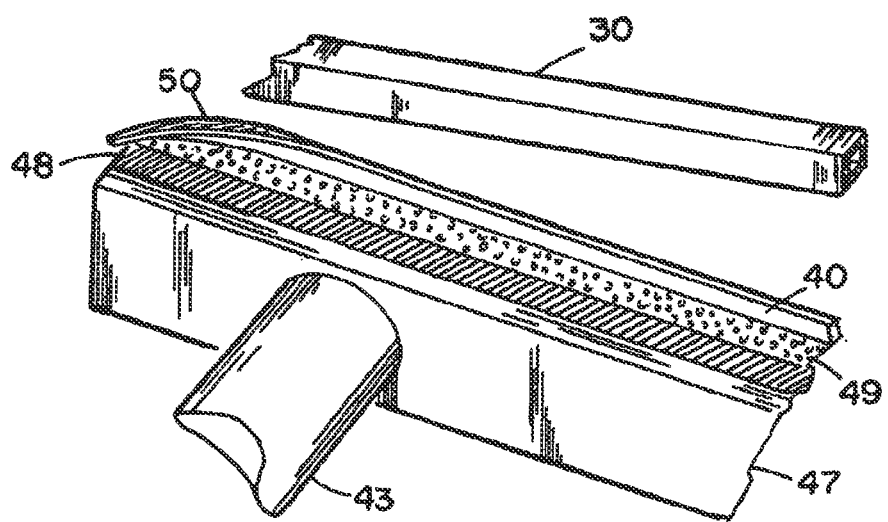
FIG. 6 is an isolated enlarged view of the cutting mechanism engaging a reel bar.

Referring specifically to FIG. 5, the length of each radial arm 43 is chosen so that a gap, yG, exists between the second end 46 of each of the plurality of radial arms 43 and the inner surface of each reel bar 30. This gap yG must be sufficient to allow the attachment of cutting blade 40 to the blade attachment surface 47.

In a preferred embodiment, each of the plurality of cutting blades 40 has a leading edge 50. The leading edge 50 engages an innermost surface of each of the plurality of reel bars 30 to cut the vegetation, as explained in greater detail below.

As a result of the eccentric displacement of the axis xR of the reel mechanism 21 relative to the axis xB of the cutting mechanism 22 by the distance xG, the blades edges 50 only make sliding contact with the inner edges 99 of the reel bars 30 in the lower front quadrant of the apparatus 20. That is, the gap zG between the circle C1 described by the rotation of the edges 50 of the cutting mechanism 22 and the circle C2 described by the rotation of the inner edges 99 of the reel bars 30 is approximately 2(xG) at the upper rear quadrant of the apparatus 20, and zero or even slightly negative at the lower front quadrant of the apparatus 20. As a consequence, grass is only cut by the resilient sliding contact between the blade edges 50 and the inner reel bar edges 99 in the lower front quadrant of the apparatus 20. This arrangement thus consumes less energy than if the cutting mechanism 22 and the reel mechanism 21 were concentric and the blades 40 and reel bars 30 made sliding contact around the complete circumference of the apparatus 20.

It will be understood by those practiced in the art that although components of the cutting mechanism 22 are identified individually as main axle 100, radial arms 43, blade attachment surfaces 47, and power transmission component 44, these components may in actuality be manufactured as a single piece using, for instance, an injection molding process. In a like manner, parts of the reel mechanism 21 identified individually as first and second endplates 31 and 32, reel bars 30, and power transmission component 35 may be manufactured in combinations other than as individual parts.

Some of the important characteristics of the apparatus 20 are: (1) the cutting blades 40 rotate inside the reel bars 30 (as opposed to the prior art in which an internal blade is fixed at the cutting height at the bottom of the assembly), and (2) the reel mechanism 21 is mounted eccentrically to the cutting mechanism 22 and makes resilient sliding contact, sequentially, with the inside edge of a reel bar 30 around a section of the rotary path of the movement of the cutting blades 40 and reel bars 30 which is greater than 10% of the complete circumference of the entire rotary path. The section in which cutting is performed preferably ranges from 10% to 30% of the complete circumference.

Figure 10:
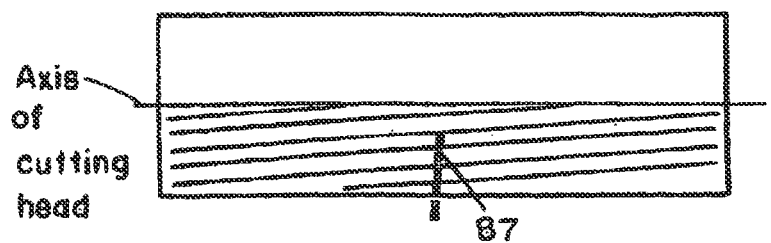
FIG. 10 is a schematic view of a blade of grass within the cutting path of a cutting blade of the present invention.
Figure 11:
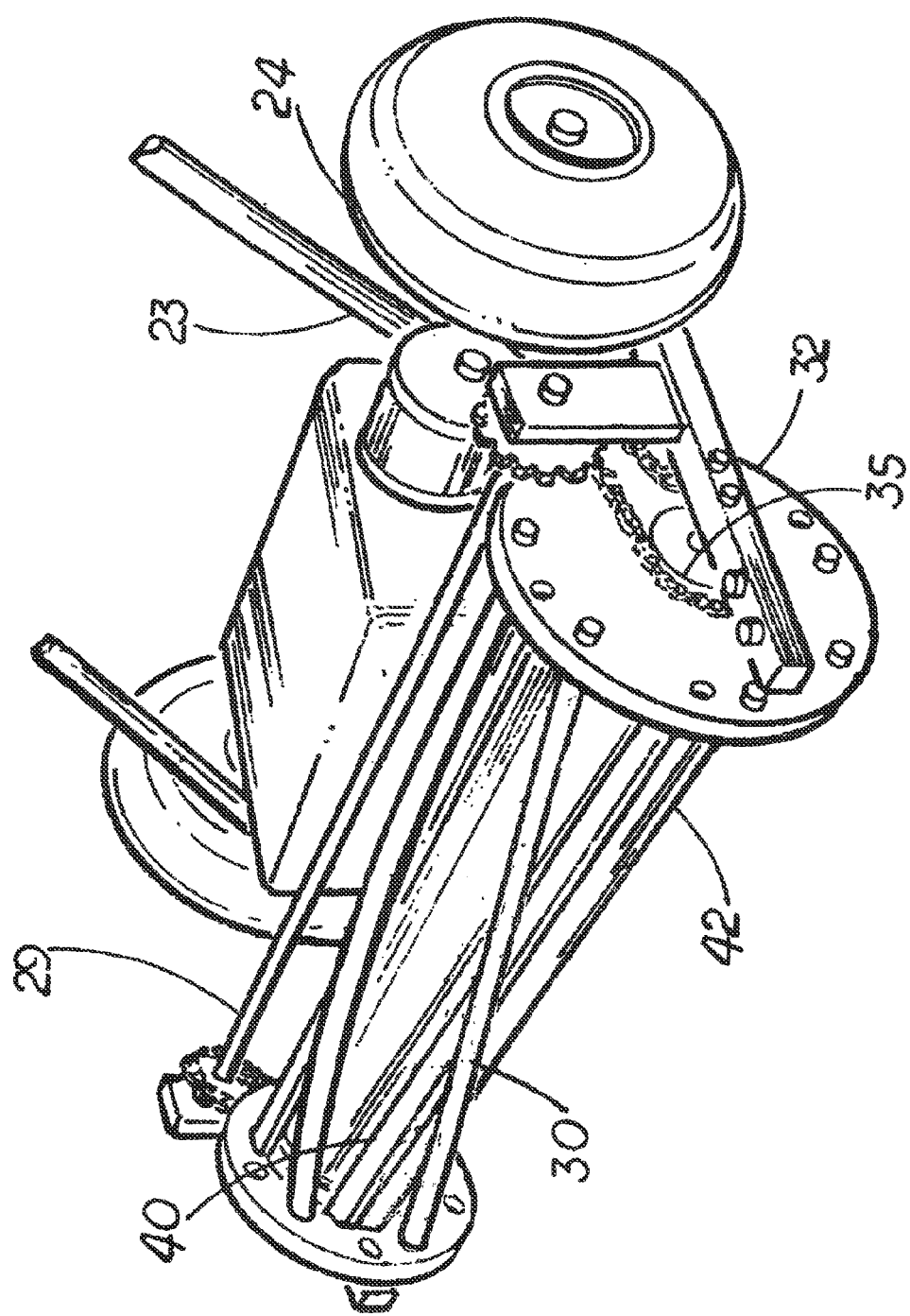
FIG. 11 is an isolated side perspective view of an apparatus of the present invention.

In a preferred embodiment, the present invention employs helical reel bars 30 and straight blades 40, as shown in FIG. 11. FIG. 10 is a schematic diagram of a view of a blade of grass 87 within the cutting path of a cutting blade 40.

The present invention relies on the resiliency/flexibility of at least one of the paired cutting elements (i.e., cutting blades 40 and reel bars 30) to overcome the need to maintain exact tolerances between the cutting elements. The preferred embodiment uses relatively flexible cutting blades 40 that may also be resiliently attached to the elastomer member 48, which is preferably a rubber or plastic foam or a metal spring. In a similar manner, the required "play" or "give" between the cutting surfaces could be provided by mounting the reel bars 30, or at least the cutting surfaces of the reel bars 30, using resilient backing such as an elastomeric material or metal springs. Alternatively, resiliency is designed into both the cutting blades 40 and the reel bars 30.

Figure 8:
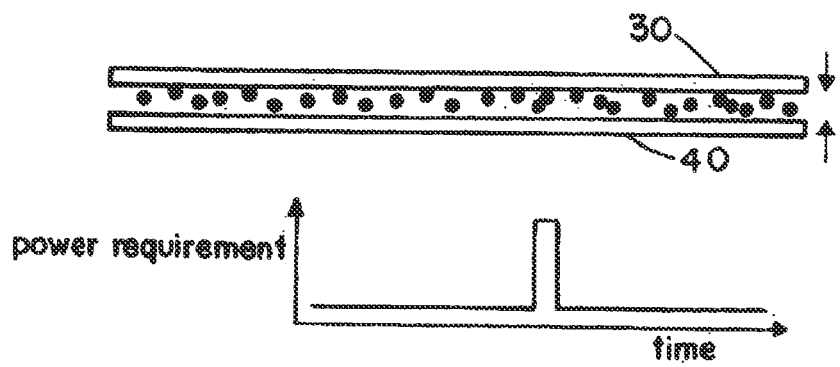
FIG. 8 is a schematic view of a comparative example of a mowing apparatus and an illustration of a power surge during a transit event.

The instantaneous angle of the long axis of a cutting blade 40 relative to the long axis of a reel bar 30 ($\theta^1$ in FIG. 1) is important in that it affects cutting efficiency as well as the power requirements over time. For example, if the blade and reel bar were parallel ($\theta^1=0$, as in FIG. 8), this would maximize the force vector of the shearing action compared to the vector that would tend to push the vegetation sideways. All the vegetation caught between the reel bar and the blade would be cut at the same instant, which would result in a high instantaneous power requirement, and pulsing of the power requirement of the cutting head over time.

Figure 9:
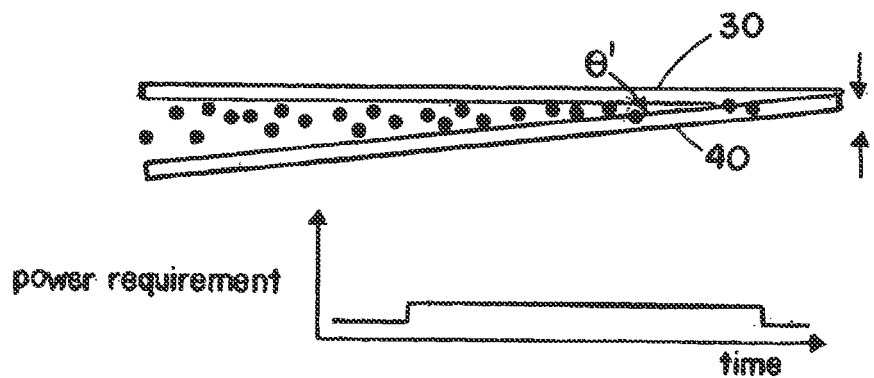
FIG. 9 is a schematic view of a cutting blade engaging a reel bar of the present invention and the power surge during the continuous transit event.

In the present invention, the angle $\theta^1 \geq 0$, as in FIG. 9, and vegetation caught between the reel bar 30 and the cutting blade 40 is cut sequentially. As long as the angle remains relatively small, the shearing force vector stays relatively large compared to the sliding force vector and cutting is relatively efficient. The instantaneous power requirement of the cutting head is reduced, and although slightly more total power is required (due to the increase of the sliding force vector) the power requirement is spread out over a greater time period, reducing power pulsations. In a preferred embodiment the angle $\theta^1$ is between 5 and 10 degrees. As a consequence, there is great latitude in selecting the proportions of the various elements of the cutting head to optimize operation for different applications. Both the number and the length of reel bars 30 are somewhat arbitrary, and depend in practice on the absolute size of the apparatus 20 and the type of vegetation to be cut. The number and length of reel bars 30 are selected to provide an effective shear angle between the reel bar 30 and the cutting blade 40, and to provide a gap of appropriate size to allow the introduction of the vegetation to be cut. As will be appreciated by those practiced in the art, it is also feasible to construct the apparatus 20 with straight reel bars 30 and helical cutting blades 40 in order to achieve the desired shear angle. It is believed, however, that the construction and use of the mechanism is simplified by using helical reel bars 30 and straight cutting blades 40.

The actual cutting path described by the sliding point of contact between blade and bar is a function of their relative angles as well as their relative speed. If the reel bar 30 were to be held fixed in space, the actual cutting path would coincide with the long axis of the reel bar 30. Conversely, if the cutting blade 40 were to be held fixed in space, the actual cutting path would coincide with the long axis of the cutting blade 40. In the case where the reel bars 30 and cutting blades 40 are converging (counter-rotating), the angle of the actual cutting path is some fraction of $\theta^1$.

EXAMPLE

A plurality of reel bars 30 is each preferably constructed of ⅜ inch steel rod. Each reel bar 30 is preferably 22.75 inches in length with a slot 95 machined along the inner length of the rod to create an edge 99 against which a blade 40 can make sliding contact. (All measurements are approximate.) A threaded hole is preferably drilled into each end 30a and 30b of each reel bar 30 to allow attachment of the reel bar 30 to the first and second end plates 31 and 32 by means such as a captive 10-24 set screw. Each of the first and second endplates 31 and 32 is preferably six inches in diameter. The first and second end plates 31 and 32 are preferably composed of cast plastic, but may be composed of other suitable material such as aluminum alloy, and a 3-inch diameter bearing 119 is set into the center of each of the endplates 31 and 32. The bearings 119 ride on bearing supports 90 which in turn are affixed to frame assembly 23. The reel mechanism 21 contains seven reel bars 30.

The two cutting blades 40 are each preferably 22.0 inches in length, 2.0 inches wide, and 0.01 inches thick and preferably composed of spring steel. Each cutting blade 40 is clamped, either at intervals or along some part of its entire length, between the blade attachment surface 47 and the removable attachment member 49 using common clamping means such as bolts or rotating cams with a flat on one side to lock the clamping mechanism in the closed position.

Other examples of the apparatus 20 could be larger or smaller, depending on the intended end use. For instance, the reel bars 30 for a compact apparatus 20 (for a small lawn) are 15 inches in length, although the diameter of the reel mechanism 21 would not likely be reduced much below 6 inches. At the other end of the spectrum, for agricultural and forestry applications, the apparatus 20 has reel bars 30 and cutting blades 40 eight feet in length, and first and second endplates 31 and 32 with a diameter of four feet.

A single 24V DC motor provides motive power for both the reel mechanism 21 and the cutting mechanism 22 through a simple chain drive assembly. The gearing of the chain drive assembly provides for approximately five revolutions of the cutting blades 40 for every one revolution of the reel bars 30. Power is provided by two 12V 9 AH/20 hr. deep discharge batteries connected in series. Power is delivered to the motor via an on-off switch that is controlled by a lever on the handle of the frame assembly 23 of the apparatus 20. The batteries in the example deliver energy that is more than sufficient to cut a moderate growth of grass on a lawn with dimensions of 100×100 feet. The batteries can be recharged using an AC charger about the size of a typical laptop computer power supply in approximately 10 hours. The batteries can also be recharged using a photovoltaic panel.

Alternative Blade and Blade Holder Embodiments

Figure 12A:
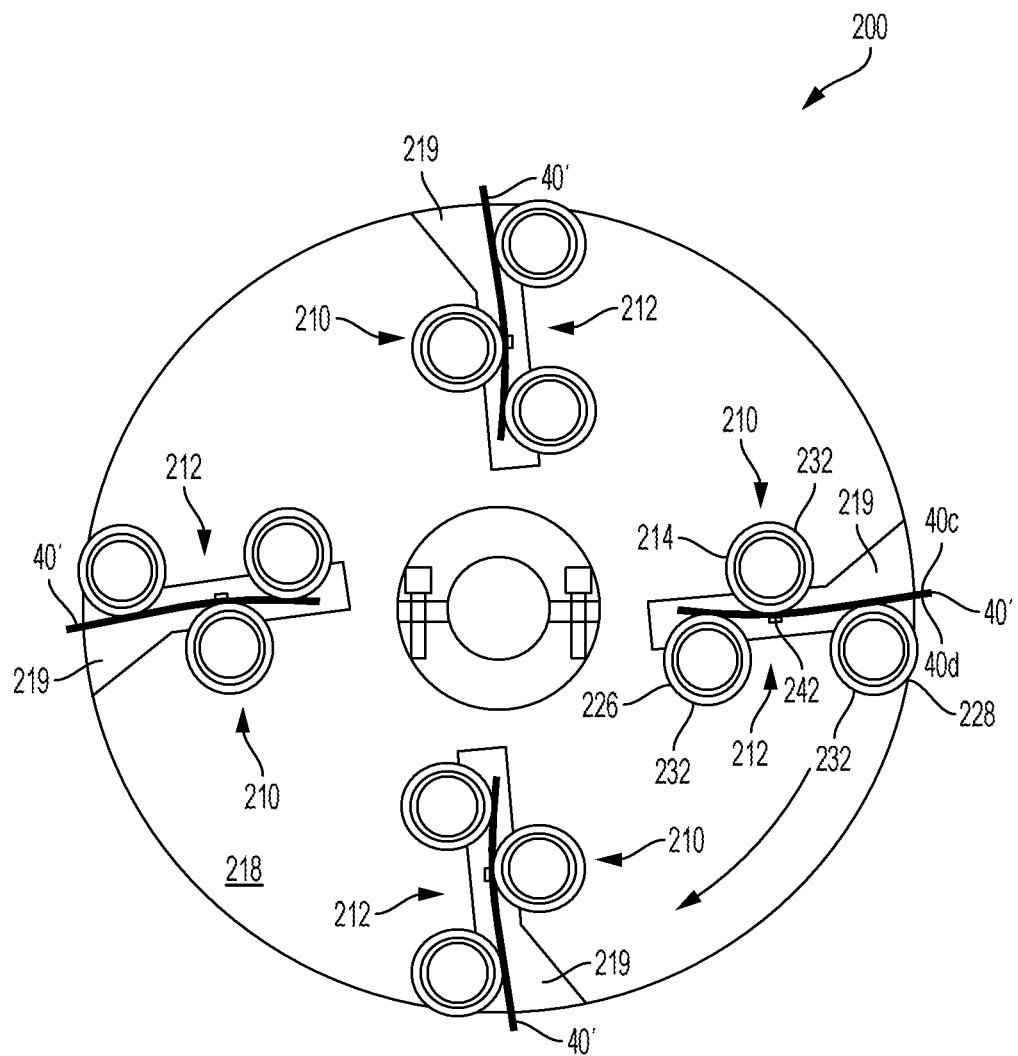
FIG. 12A is a schematic side view of a first alternative embodiment of a blade holding mechanism, in which a plurality of such mechanisms are shown.
Figure 12B:
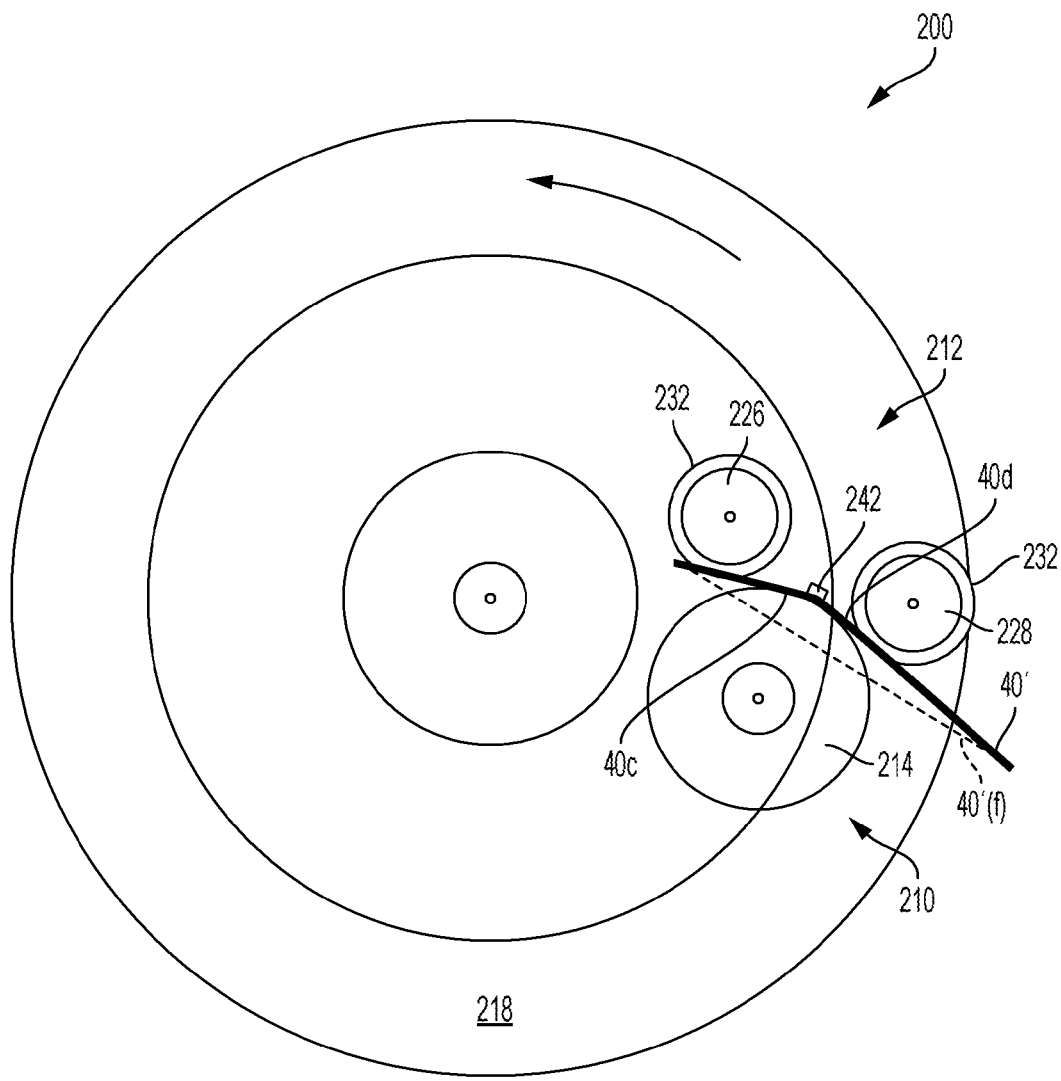
FIG. 12B is an enlarged view of a single one of the blade holding mechanisms of FIG. 12A, with the other mechanisms and some other associated details being omitted, to show how the blade is transformed from a flat (uninstalled) state to a bent (installed) state by the blade holding mechanism.
Figure 13:
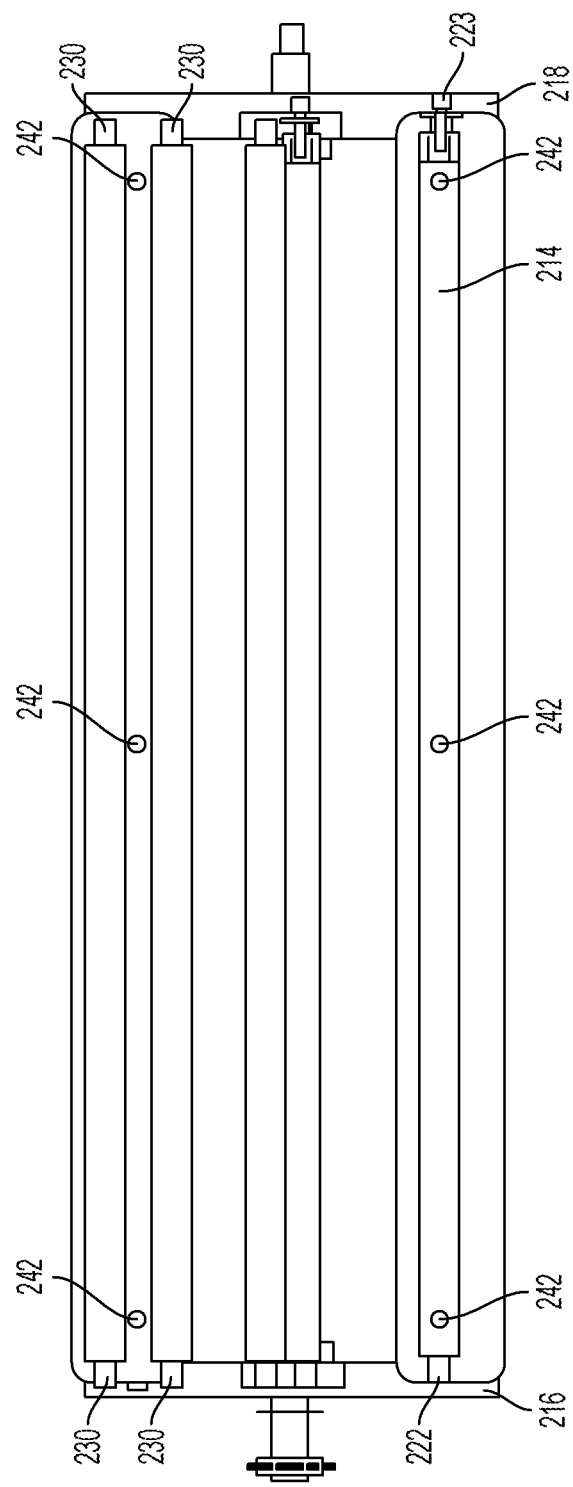
FIG. 13 is a schematic plan view of the components of FIG. 12A.
Figure 14:
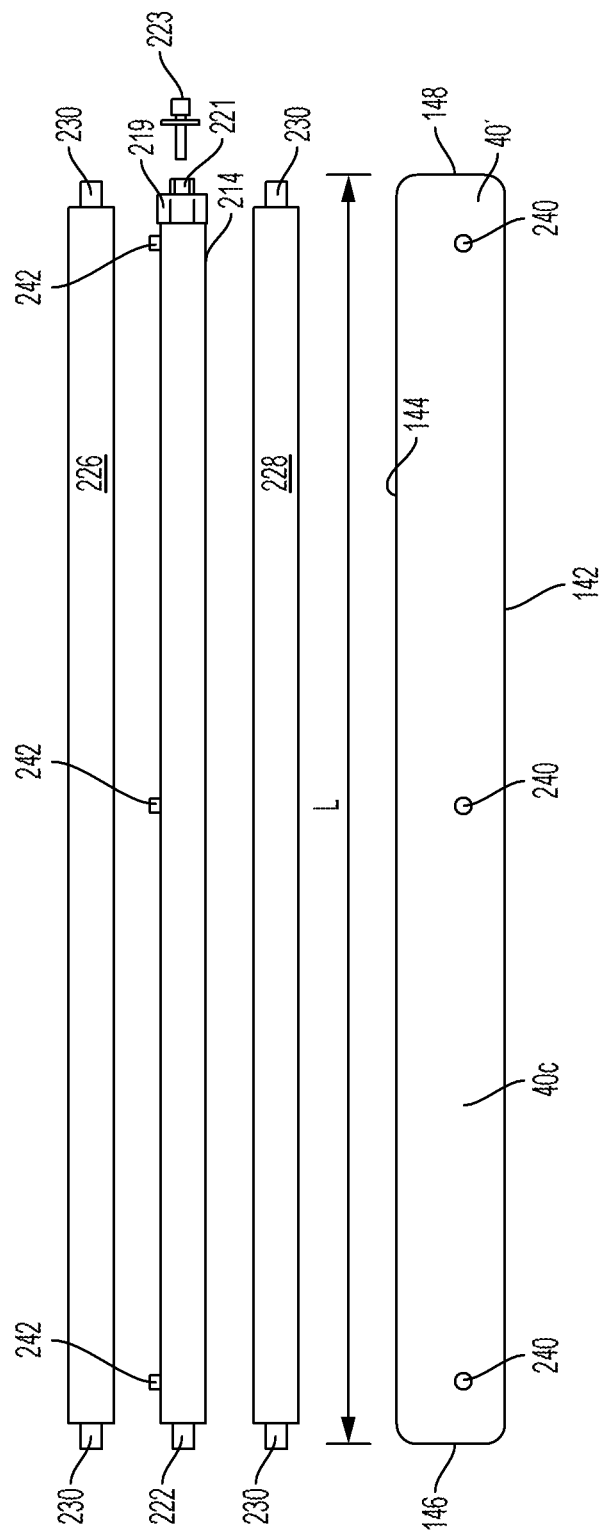
FIG. 14 is a schematic view of the first and second blade contacting means of FIG. 12A, shown with the components in a partially exploded state.
Figure 15:
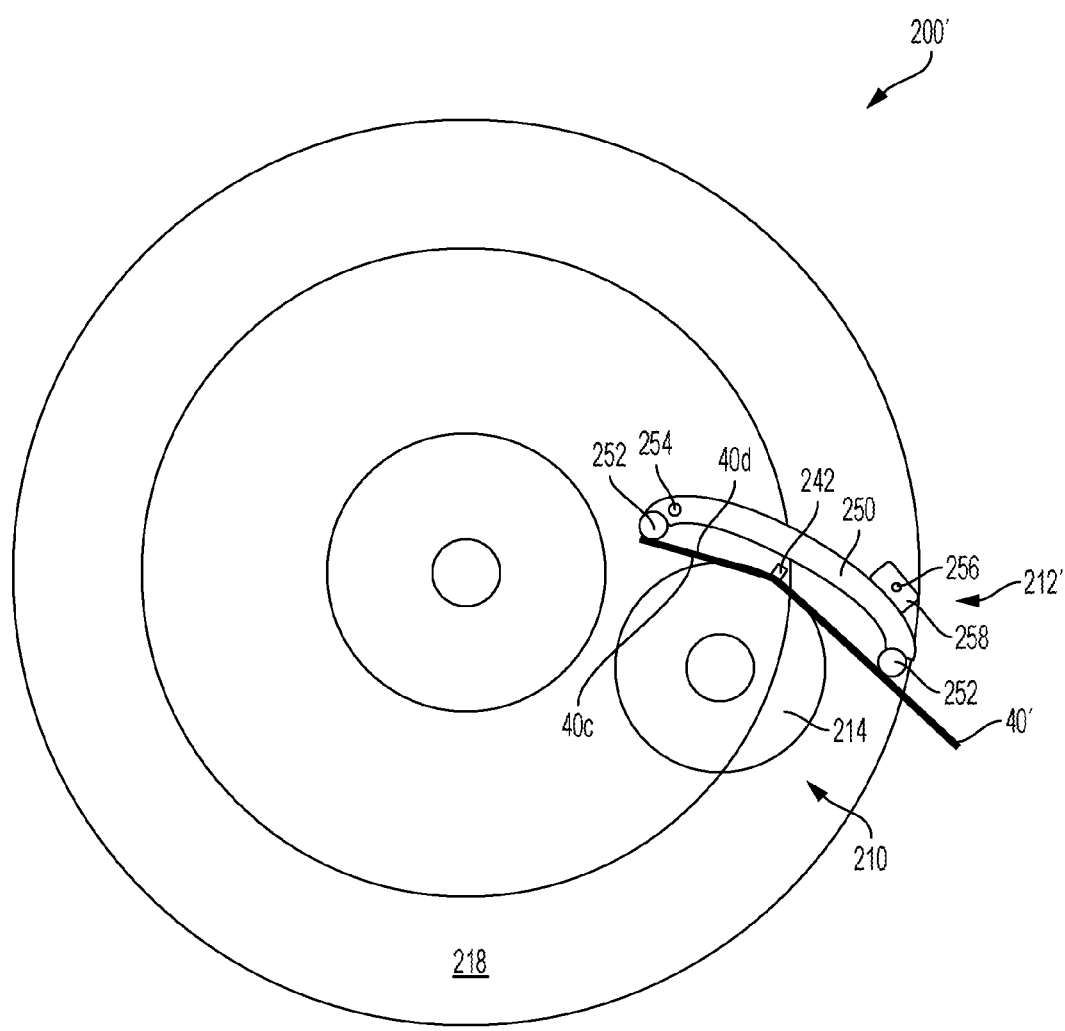
FIG. 15 is an enlarged view of a single one of the blade holding mechanisms of a second alternative configuration, with the other mechanisms and some other associated details being omitted.

Instead of using the radial arms 43 (FIG. 5) and associated components described above, other means of securing the blades 40 to the apparatus 20 may also be utilized. Such alternative blades and alternative blade holder mechanisms, as well as methods of securing the blades within the mechanisms, will be described next, with reference to FIGS. 12-16, where FIGS. 12-14 depict a first alternative blade holder mechanism, FIG. 15 depicts a second alternative blade holder mechanism, and FIGS. 16A-16D depict various embodiment of blades that can be used within either of the alternative blade holder mechanisms. In this description, components that are the same as those described above with reference to the earlier embodiments will be assigned the same reference numbers utilized earlier, while components that are similar to those described above, but are somewhat different, will be assigned the same reference numbers utilized earlier, but will be designated with one or more prime symbols (e.g., blade 40 of FIG. 5 will be referred to as blade 40' in FIG. 12), and only the differences will be described.

Turning now to FIGS. 12-14, a first alternative embodiment of a blade holder arrangement 200 is shown and will be described. It should be noted that for ease of understanding, FIGS. 12-14 primarily show the blade holder structure, without depicting other components, such as the reel bars 33, reel endplates 31 and 32, etc., but that such other components of previous embodiments are still present in these alternative embodiments, and that the interaction between the blades and reel bars is still the same as described above for the earlier embodiments, unless otherwise noted.

Briefly, the blade holder arrangement 200 includes a first blade contacting structure 210, which makes contact with a first surface 40c of blade 40', and a second blade contacting structure 212, which makes contact with a second surface 40d of blade 40'. In this first alternative embodiment, the first blade contacting structure 210 includes a roller 214, whose ends are respectively mounted to first and second endplates 216 and 218 (see FIGS. 12A, 12B and 13). Preferably, the roller 214 is mounted to the endplates 216, 218 in a manner that allows for the roller to be rotatably adjusted to a variety of different positions before being secured at one of the positions. For example, one end of the roller 214 may include a threaded bore 219 (FIG. 14), within its axle portion 221, where bore 219 is configured to receive a bolt 223 (FIGS. 13, 14), while the other end of roller 214 merely includes an axle portion 222. The axle portions 221, 222 are configured and arranged to be received within bores formed in endplates 216 and 218, whereby the combination of the threaded bore 219 and bolt 223 allows for the roller to 214 to be rotated to a desired position, and then locked in that position via tightening of the bolt, to maintain the blade 40' at the desired position in order to properly position the edge of blade 40' with respect to the reel bars 30 (FIG. 5). Of course other means of securing the roller 214 between the endplates are also contemplated as being within the scope of the invention, especially where such means allow for rotational adjustment of the roller prior to being locked. For example, adjustment and locking of the roller 214 may be accomplished via a combination of a lever arm, a pin and a plurality of apertures in the endplate, such as by including a lever arm that extends radially from one end of the rollers and that includes a spring-loaded retractable pin that extends parallel to the axis of the roller, and by including a plurality of apertures in the endplate, whereby the roller may be locked into the rotationally adjusted position by securing the pin within the corresponding aperture of the endplate.

In the embodiment of FIGS. 12-14, the second blade contacting structure 212 includes a pair of rollers 226, 228, which are configured and arranged to make contact with the second surface 40d of the blade 40'. Rollers 226 and 228 are preferably mounted for rotation with respect to endplates 216 and 218 using any desired mounting method. For example, the ends of each of the rollers 216 and 218 may simply each include an axle portion 230 configured and arranged to be rotatably received within a corresponding bore on each of the endplates 216 and 218.

Each of the three rollers 214, 226 and 228 may be formed of a mild steel tube, or other desired material, and each roller is optionally covered with an elastomeric coating 232 (FIG. 12A), such as natural or artificial rubber. All three rollers 214, 226 and 228 may be of the same diameter, such as shown in FIG. 12A, or any combination of differently sized diameters may be used, such as shown in FIG. 12B (which only depicts a single blade contacting structure pair 210/212 for ease of reference), in which roller 214 is of a larger diameter than that of rollers 226 and 228.

By way of example only, in one embodiment, the rollers 214, 226 and 228 are each 21.5 inches long (length "L" of FIG. 14) and have an outer diameter of 0.5 inches, without the elastomeric coating, and an outer diameter of 0.625 inches with the elastomeric coating included. Of course while other dimensions are also contemplated, Applicant envisions that the length L will be between about 10 and 60 inches, and that the outer diameter of the rollers (including any coating) will be between 0.5 and 4 inches.

Figure 12C:
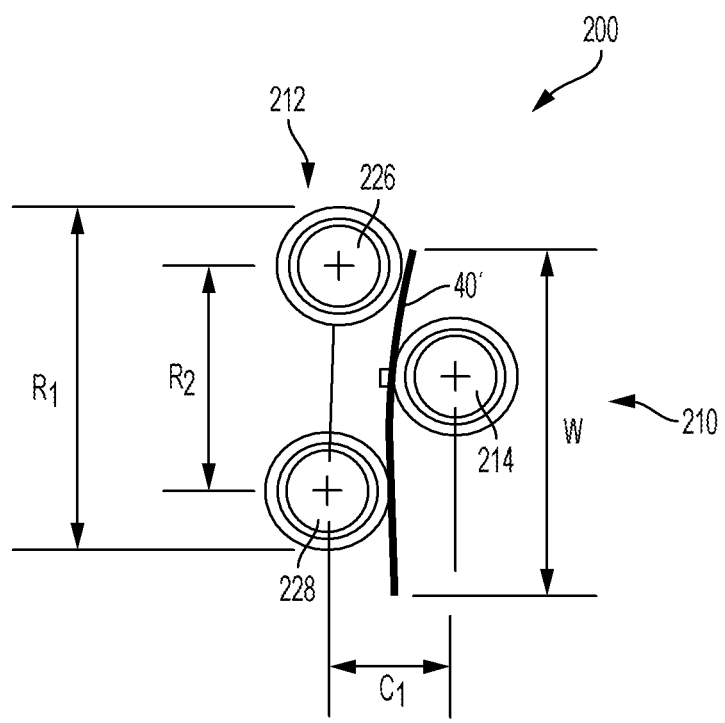
FIG. 12C is a simplified view of one of the blade holding mechanisms of FIG. 12A showing an example of how the various components can be spaced from each other.

Also by way of example only, FIG. 12C shows some sample separation distances between rollers 214, 226, and 228, for a blade 40 of width W, where distance $R_1$ represents the distance between the outer peripheries of rollers 226 and 228; distance $R_2$ represents the distance between the centers of rollers 226 and 228; and distance $C_1$ represents the distance between the a line connecting the centers of rollers 226 and 228 and the center of roller 214. For example, in one embodiment for blade 40' where width W of the blade 40' is 2.0 inches, the distance $R_1$ may be set at approximately 1.75 inches; the distance $R_2$ may be set to approximately 1.125 inches, and the distance $C_1$ may be set to 0.5 inches. Of course, other dimensions, even for a blade of a width of 2.0 inches, are also contemplated, and especially where blades of other widths are used, as long as the resulting position of the blade provides the desired overhang past the outer circumference of the endplates to enable the blades to make resilient sliding contact with the reel bars. Further, it is believed that the dimension $R_1$ should be set to be less than or equal to the dimension W (or within about 30%), and that the dimension $R_2$ should be set to between about 50% and about 75% of the dimension $R_1$. Also, depending on the flexibility of blade 40' and the diameters of the rollers, the dimension $C_1$ may be increased or decreased. Finally, although in this embodiment the roller 214 is spaced equally from both roller 226 and from roller 228, it is contemplated that uneven spacing would also be functional.

When a blade 40' is in a secured (or installed) state within the first and second blade contacting structures 210/212, the blade 40' is held under slight tension provided by the first and second contacting structures 210/212, and in preferred embodiments the blade 40' is also slightly bent. In particular, as can be seen in FIG. 12B, the dashed representation of the blade 40'(f) depicts the blade 40' in its flat state, prior to being installed, while the solid line representation of the blade 40' depicts the blade in its installed state, where it can be seen that blade 40' is bent such that first surface 40c is transformed into a concave surface and second surface 40d is transformed into a convex surface. With the blade 40' in such a bent state, and being flexible, the proper "angle of attack" of less than 90° between the blades 40' and the counter-rotating reel bars 30 (FIG. 5) can be provided, which reduces stress on the blade 40.

In certain embodiments, the bending forces applied by the first and second blade contacting structures 210/212 bend the elongated blade 40' by a force sufficient to ensure that the concave curvature of the first surface 40c of the blade 40 approximates the curvature of the circumference of a circle with a diameter in the range of between approximately eight to thirty inches, and/or that the midpoint of the first surface 40c of the blade is displaced from the starting planar position by a distance in the range of approximately 0.12 to 0.03 inches. However, other bending forces are also contemplated, especially for blades of different sizes; for blades of different thicknesses; and for blades made materials that have a different amount of flexibility. For example, in one non-limiting specific embodiment, it is believed that when a force equivalent to approximately five pounds per linear inch is applied across a blade of a 2 inch width, the concave curvature of the first surface of the blade approximates the curvature of the circumference of a circle with a diameter of fifteen inches, and the midpoint of the concave first surface of the blade is displaced from the starting planar position by approximately 0.06 inches.

Returning to FIG. 12A, it can be seen that endplate 218 also preferably, but optionally, includes a plurality of Y-shaped slots 219, with one slot 219 being configured to seat the end of each blade 40'. Although not shown in the views depicted in the figures, the other endplate, endplate 216, may also include similar Y-shaped slots 219. Essentially, endplate 216 is a mirror image of endplate 218, and thus the two endplates 216 and 218 are configured and arranged to receive the rollers 214, 226 and 228 and the blades 40' therebetween, such as depicted in FIG. 13, whereby it can be seen that rollers 214, 226, 228 and the blade 40' all extend parallel to each other in their axial directions. The Y-shaped slots 219 in one endplate (216 or 218), or in both endplates (216 and 218), facilitate removal and replacement of the blade 40' by providing a cavity into which one axial edge (146 or 148) of the blade may be temporarily positioned while removing/mounting the blade upon the first blade contacting structure 210 because of the limited axial space between the two endplates 216 and 218. Alternatively, if the Y-shaped slots are not provided, the blade 40' may simply be flexed in the axial direction, thereby enabling it to be positioned on the first blade contacting structure 210 between the two endplates 216 and 218.

In addition, the Y-shaped slots 219 also provide some additional guidance and stability for the ends of the blades 40', even if blade 40 is forced out of position by an obstruction (such as a rock or heavy branch) while the entire blade holder arrangement 200 is rotated in the direction of the arrow depicted in FIG. 12A. In other words, the outer circumferential portion of each of the Y-shaped slots 219 is wider than the inner circumferential portion so that it can accommodate some flexing of the outer edge of the blade 40' caused by contact with an obstruction while the blades (and remainder of the assembly 200) are rotated in the direction of the arrow.

In one preferred embodiment, the blade 40' is preferably made of a thin, flexible sheet of material that defines a first side edge 142 (FIG. 14) and a second side edge 144 that each extend between a first axial edge 146 and a second axial edge 148, thereby defining a generally rectangular first face 40c and a generally rectangular second face 40d (FIG. 12A), wherein the first and second faces 40c, 40d are disposed to face in opposite directions. As explained in more detail herein, the blade 40' is configured and arranged such that, upon simultaneous application of at least one first contact force upon the first face 40c from the first blade contacting means 210 and at least two second contact forces upon the second face 40d from the second blade contacting means 212, the sheet of blade 40' is transformed from a first state to a second state. In particular, in the first state, the first and second faces 40c, 40d of the sheet are substantially planar (such as the dashed line 40'(f) of FIG. 12B) and wherein in the second state, the first face 40c is generally concave and the second face 40d is generally convex, as shown by the solid line representation of blade 40' in FIG. 12B.

One example of an embodiment of such a blade 40' involves forming the sheet of the blade of spring steel of approximately 0.015 inch thickness; having each of the first and second side edges 142, 144 (FIG. 14) extend to a length of approximately 21.5 inches; and having each of the first and second axial edges 146, 148 extend to a width of approximately 2 inches. Of course other materials, dimensions, and thicknesses and also contemplated, such as having the side edges 142, 144 extend to any length between 10 and 60 inches (to thereby correspond to the length L of the rollers 214, 226, 228), having the axial edges 146, 148 extend to any length between 1.5 and 6 inches, and having a thickness of between 0.01 and 0.1 inches, depending on the material. One of the benefits of such a thin, flexible blade 40' is that it does not need to include a sharpened edge, and thus sharpening and/or replacement of dull blades with sharpened blades is not a concern. However, for thicker blades, it is contemplated that sharpened edges may be provided, if desired.

The present blade holder arrangement 200 and blade combination also preferably includes an orienting means that is configured and arranged to position the blade 40' with respect to the first blade contacting means 210. In one embodiment, as shown in FIG. 14, the blade orienting means includes a plurality of through holes 240 formed in the blade 40'. The through holes 240 are preferably evenly spaced from each other, but uneven spacing is also contemplated. In the embodiment shown in FIG. 14, three through holes 240 are provided, but more through holes are also contemplated, as well as less through holes, such as the two through holes shown in the embodiment of FIG. 16A. The through holes 240 are configured and arranged to cooperate with a plurality of projections 242 (FIG. 14, as well as FIGS. 12A-12C) that are formed on the roller 214 of the first blade contacting means 210.

Figure 16A:
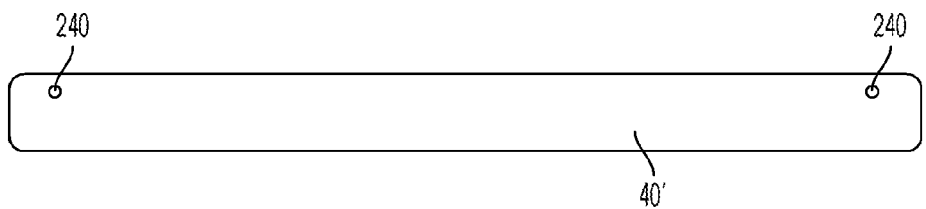
FIGS. 16A-16D are schematic views of various embodiments of blade orienting means.
Figure 16B:
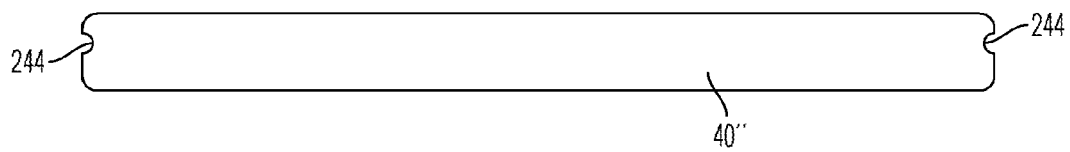
Figure 16C:
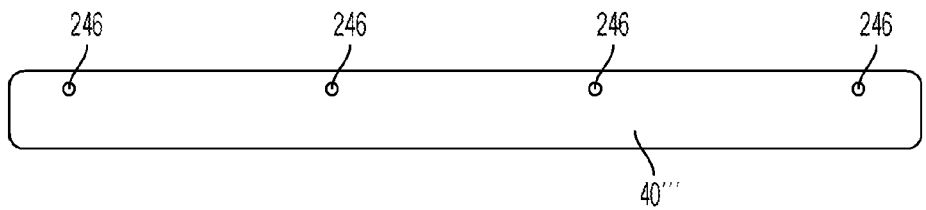
Figure 16D:
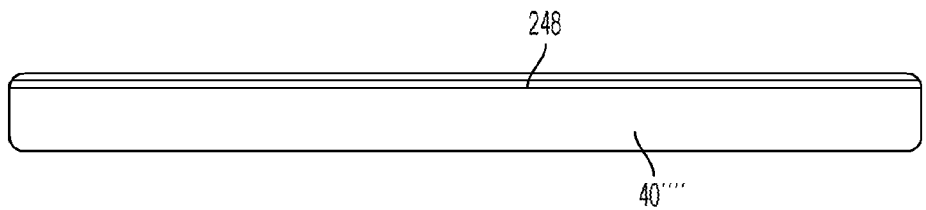

FIGS. 16B-16D show examples of other alternative configurations of the orienting means. In particular, FIG. 16B shows a blade 40" that includes a pair of notches 244, with one notch formed in each of the axial edges of blade 40". The notches 244 are configured and arranged to cooperate with a pair of spaced projections (not shown) formed on the roller 214 of the first blade contacting means 210. FIG. 16C shows a blade 40''' in which the orienting means includes a plurality of spaced dimples 246 formed in the blade. The dimples 246 are configured and arranged to cooperate with a plurality of spaced projections (not shown), that are preferably of a smoothly curved outer periphery, and that are formed to project from the roller 214 of the first blade contacting means 210. Finally, FIG. 16D shows a blade 40'''' in which the orienting means includes a single elongated axial projection 248 that extends outwardly from the blade. The elongated axial projection 248 is configured and arranged to cooperate with an elongated axial groove (not shown) formed within the roller 214 of the first blade contacting means 210.

Although certain elements of the orienting means (such as projections 242 of FIG. 14) are shown and described as being associated with roller 214 of the first blade contacting structure 210, it is also contemplated that such elements of the orienting means could alternatively be associated with the second blade contacting structure 212. For example, the projections 242 of FIGS. 12B and 14 could be formed to extend from either roller 226 or roller 228 of the second blade contacting structure 212, instead of from roller 214 as previously described. In such embodiments, the roller with the orienting means (either roller 226 or roller 228) would be the roller that is mounted to the endplates such that it can be rotatably adjusted and then locked into the rotationally adjusted position, such as via a pin or a bolt, and the other rollers could merely be rotatably mounted to the endplates. Of course, the other embodiments of the orienting means described herein could also be associated with the second blade contacting means, instead of with the first blade contacting means, in a similar manner.

Turning now to FIG. 15, a second alternative embodiment of a blade holder arrangement 200' is shown and will be described. It should be noted that for ease of understanding, FIG. 15 only shows a single blade holder structure 200', but in preferred embodiments there will be a plurality of blade holder structures 200' (one for each blade). Further, as with the first alternative embodiment 200 of a blade holder arrangement, FIG. 15 primarily depicts the components of the blade holder arrangement 200', without depicting other components, such as the reel bars 33, reel endplates 31 and 32, etc., but it should be understood that such other components of previous embodiments are still present in this alternative embodiment, and that the interaction between the blades and reel bars is still the same as described above for the earlier embodiments, unless otherwise noted.

Briefly, the blade holder arrangement 200' of FIG. 15 includes the same first blade contacting structure 210 as described above with regard to blade holder arrangement 200 of FIGS. 12-14, and thus the features of the first blade contacting structure 210 need not be described again. However, in the FIG. 15 embodiment, the second blade contacting structure 212' differs from structure 212 previously described. Specifically, instead of including rollers 226 and 228 (of the embodiment of FIGS. 12-14), the second blade contacting structure 212' of the FIG. 15 embodiment includes a curved plate 250, which extends in the axial direction parallel to the blade 40'. Although in this embodiment the plate 250 is shown and described as being curved, it is also contemplated that plate 250 could be of other cross-sectional shape, such as V-shaped, L-shaped or of other desired cross-sectional shapes, as long as the desired forces can be applied to the blade.

Preferably, the curved plate 250 includes a pair of elastomeric members, or beads 252, that are configured and arranged to make line contact with the surface 40d of the blade 40'. Thus, the combination of the curved plate 250 and the elastomeric members 252 of the FIG. 15 embodiment performs the same function as the rollers 226, 228 of the embodiment of FIGS. 12-14 (i.e., applying a pair of forces to the blade to secure it in position). The FIG. 15 embodiment can also include the plurality of projections 242 (and associated holes) or any other desired orienting means, such as those shown in FIGS. 16A-16D.

Any desired means may be used to mount the plate 250 to the endplates 216 and 218. For example, the curved plate 250 may include a pivot pin 254 (or a hole for receiving a pivot pin) that defines a pivot point near each axial end thereof. Each of the pivot pins 254 can be configured and arranged to be inserted into an associated aperture in an associated one of the endplates 216, 218. A pair of spring-loaded retractable pins 256 (with only one shown in FIG. 15) may also be employed to help secure the curved plate 250 into position within the endplates 216 and 218. For example, one pin 256 can be configured and arranged to be inserted into an associated aperture in each of the endplates 216, 218. Alternatively, the curved plate 250 may include an aperture near each axial end thereof (such as within tab 258) for receiving a spring-loaded pin that passes through an associated aperture in an associated one of the endplates 216, 218. Using such a mounting means that includes the pivot points and spring-loaded pins provides for a relatively straightforward method of replacing the blade 40' because once pins 256 are both retracted, the curved plate 250 can be rotated counter-clockwise about pivot point 254, thereby providing easy access for removal of blade 40'. The new blade 40' can then be positioned (and oriented on projections 242, if provided), the curved plate 250 can then be rotated clockwise about pivot point 254, and the pins 256 can be reinserted, thereby securing the curved plate 250 (and the blade 40') in position.

Various preferred methods of securing each of the blades 40' (or 40', 40", 40''' or 40'''') to an associated blade holding arrangement 200 or 200' of an apparatus for cutting vegetation, such as mowing apparatus 20, will be described next. For ease of explanation, the method will be described with reference to blade 40' only, but is should be apparent how such method can be applied to the other embodiments of the blade, such as 40", 40''' and 40''''.

Basically, the method includes providing an elongated blade, such as blade 40', which is configured and arranged to be relatively flexible, and then positioning the elongated blade 40' between the first blade contacting structure 210 and the second blade contacting structure 212 or 212', such that the first blade contacting structure 210 makes contact with the first surface 40c of the elongated blade 40' and the second blade contacting structure 212/212' makes contact with the second surface 40d of the elongated blade 40'. As can be seen in FIG. 12A, the first surface 40c of the elongated blade 40' and the second surface 40d of the elongated blade 40' face in opposite directions from each other. The positioning step just described results in a plurality of bending forces being applied to the first and second surfaces (40c, 40d) of the elongated blade 40' via the first and second blade contacting structures (210, 212/212') thereby bending the elongated blade 40' such that the first surface 40c of the elongated blade is transformed into a concave surface and the second surface 40d of the elongated blade is transformed into a convex surface. These bending forces secure the elongated blade 40' to the apparatus 20 for cutting vegetation.

The method could also include a step of orienting the blade with respect to the roller of the first blade contacting structure, if any of the corresponding orienting means are provided. For example, with the blade of FIG. 16A, the orienting step includes orienting the blade 40' upon the roller 214 (FIGS. 12A-12C and 14) by inserting each of the plurality of spaced projections 242 that each extend radially outwardly from the roller 214 into an associated one of the plurality of through holes 240 that are formed within the elongated blade 40'. From this description, it should be clear how the orienting step is performed for blades of other configurations, such as those of FIGS. 16B-16D.

From the foregoing it is believed that those skilled in the pertinent art will recognize the meritorious advancement of this invention and will readily understand that while the present invention has been described in association with preferred embodiments thereof, and other embodiments illustrated in the accompanying drawings, numerous changes, modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

What is claimed is:

1. A method of securing a blade to an apparatus for cutting vegetation, wherein the apparatus includes a first blade contacting structure and a second blade contacting structure, the method comprising:

providing an elongated blade, wherein the elongated blade is configured and arranged to be relatively flexible; and positioning the elongated blade between the first blade contacting structure and the second blade contacting structure such that the first blade contacting structure makes contact with a first surface of the elongated blade and the second blade contacting structure makes contact with a second surface of the elongated blade, wherein the first blade contacting structure is mounted between a pair of endplates that are configured and arranged for rotation, wherein the first surface of the elongated blade and the second surface of the elongated blade face in opposite directions from each other, and wherein said positioning step results in a plurality of bending forces being applied to the first and second surfaces of the elongated blade via the first and second blade contacting structures, thereby bending the elongated blade such that the first surface of the elongated blade is transformed into a concave surface and the second surface of the elongated blade is transformed into a convex surface, and whereby the bending forces secure the elongated blade to the apparatus for cutting vegetation.

2. A method of securing a blade to an apparatus for cutting vegetation, wherein the apparatus includes a first blade contacting structure and a second blade contacting structure, the method comprising:

providing an elongated blade, wherein the elongated blade is configured and arranged to be relatively flexible; and positioning the elongated blade between the first blade contacting structure and the second blade contacting structure such that the first blade contacting structure makes contact with a first surface of the elongated blade and the second blade contacting structure makes contact with a second surface of the elongated blade, wherein the first surface of the elongated blade and the second surface of the elongated blade face in opposite directions from each other, and wherein said positioning step results in a plurality of bending forces being applied to the first and second surfaces of the elongated blade via the first and second blade contacting structures, thereby bending the elongated blade such that the first surface of the elongated blade is transformed into a concave surface and the second surface of the elongated blade is transformed into a convex surface, and whereby the bending forces secure the elongated blade to the apparatus for cutting vegetation, wherein the first blade contacting structure comprises a first elongated roller extending in an axial direction between a first axial end and a second axial end, wherein the elongated blade includes first and second side edges that each extend axially between a first axial edge and a second axial edge, and wherein the first elongated roller and the elongated blade extend parallel to each other, in the axial direction.

3. The method according to claim 2, wherein:

the second blade contacting structure comprises a second elongated roller extending in an axial direction between axial ends thereof and a third elongated roller extending in the axial direction between axial ends thereof, and the second elongated roller, the third elongated roller, and the elongated blade all extend parallel to each other, in the axial direction.

4. The method according to claim 2, wherein:

the second blade contacting structure comprises a curved plate extending in an axial direction between axial ends thereof, and the curved plate and the elongated blade extend parallel to each other, in the axial direction.

5. The method according to claim 4, wherein the curved plate includes at least one first elastomeric member and at least one second elastomeric member, wherein the first and second elastomeric members are configured and arranged to make contact with first and second positions, respectively, on the second surface of the elongated blade.

6. The method according to claim 2, further comprising orienting the elongated blade upon the first elongated roller by inserting each of a plurality of spaced projections that each extend radially outwardly from the first elongated roller into an associated one of plurality of through holes that are formed within the elongated blade.

7. The method according to claim 2, further comprising orienting the elongated blade upon the first elongated roller by aligning a pair of spaced projections that each extend radially outwardly from the first elongated roller with an associated pair of notches formed in the first and second axial edges of the elongated blade.

8. The method according to claim 2, further comprising orienting the elongated blade upon the first elongated roller by aligning each of a plurality of spaced projections that each extend radially outwardly from the first elongated roller with an associated one of plurality of dimples that are formed within the elongated blade.

9. The method according to claim 2, further comprising orienting the elongated blade upon the first elongated roller by aligning a single elongated axial projection that extends outwardly from the first surface of the blade with an axially extending groove formed within the first elongated roller.

10. The method according to claim 1, wherein the bending forces bend the elongated blade by a force sufficient to ensure that the concave curvature of the first surface of the blade approximates the curvature of the circumference of a circle with a diameter in the range of eight to thirty inches, and the midpoint of the first surface of the blade is displaced from the starting planar position by a distance in the range of 0.12 to 0.03 inches.

11. The method according to claim 1, wherein the apparatus is a mowing apparatus that is configured and arranged to receive a plurality of the elongated blades.

12. A blade for a mowing apparatus, the blade comprising:
a thin, flexible sheet of material that defines first and second side edges that extend between first and second axial edges, and that further defines a generally rectangular first face and a generally rectangular second face, wherein said first and second faces are disposed to face in opposite directions;
wherein said sheet is configured and arranged to be secured within a first blade contacting means of the mowing apparatus and a second blade contacting means of the mowing apparatus, wherein the first blade contacting means is mounted between a pair of endplates that are configured and arranged for rotation;
wherein said sheet is further configured and arranged such that, upon simultaneous application of at least one first contact force upon said first face from the first blade contacting means and at least two second contact forces upon said second face from the second blade contacting means, said sheet is transformed from a first state to a second state;
wherein in said first state, said first and second faces of said sheet are substantially planar and wherein in said second state, said first face is generally concave and said second face is generally convex.

13. The blade according to claim 12, further comprising an orienting means that is configured and arranged to position the blade with respect to the first blade contacting means.

14. The blade according to claim 13, wherein said orienting means comprises a plurality of spaced through holes formed within said sheet, wherein said through holes are configured and arranged to cooperate with a plurality of projections formed on the first blade contacting means.

15. The blade according to claim 13, wherein said orienting means comprises a pair of notches formed in said first and second axial edges, wherein said notches are configured and arranged to cooperate with a pair of spaced projections formed on the first blade contacting means.

16. The blade according to claim 13, wherein said orienting means comprises a plurality of spaced dimples formed in said sheet, wherein said dimples are configured and arranged to cooperate with a plurality of projections formed on the first blade contacting means.

17. The blade according to claim 13, wherein said orienting means comprises a single elongated axial projection that extends outwardly from said first face of said sheet, wherein said elongated axial projection is configured and arranged to cooperate with an elongated axial groove formed within the first blade contacting means.

18. The blade according to claim 13, wherein:
said material of said sheet comprises spring steel of approximately 0.015 inch thickness;
each of said first and second side edges extends to a length of approximately 21.5 inches;
each of said first and second axial edges extends to a width of approximately 2 inches; and
a force equivalent to approximately five pounds per linear inch of blade length is applied across the 2 inch width of the blade so that the concave curvature of the first surface of the blade approximates the curvature of the circumference of a circle with a diameter of fifteen inches, and the midpoint of the concave first surface of the blade is displaced from the starting planar position by approximately 0.06 inches.

19. The blade according to claim 12, further comprising an orienting means that is configured and arranged to position the blade with respect to the second blade contacting means.

20. The method according to claim 3, further comprising orienting the elongated blade with respect to the second elongated roller by inserting each of a plurality of spaced projections that each extend radially outwardly from the second elongated roller into an associated one of plurality of through holes that are formed within the elongated blade.

21. An apparatus for cutting vegetation, the apparatus comprising:
a frame assembly;
a pair of endplates that are supported by the frame assembly and are configured and arranged for rotation with respect to the frame assembly;
means for providing rotation movement to the endplates; and
a plurality of blades extending between the endplates;
wherein each of said blades comprises a thin, flexible sheet of material that defines first and second side edges that extend between first and second axial edges, and that further defines a first face and a second face, wherein said first and second faces are disposed to face in opposite directions;
wherein said sheet is secured within a first blade contacting structure and a second blade contacting structure, wherein the first blade contacting structure is mounted between the pair of endplates;
wherein said sheet is further configured and arranged such that, upon simultaneous application of at least one first contact force upon said first face from the first blade contacting structure and at least two second contact forces upon said second face from the second blade contacting structure, said sheet is transformed from a first state to a second state; and
wherein in said first state, said first and second faces of said sheet are substantially planar and wherein in said second state, said first face is generally concave and said second face is generally convex.

22. The apparatus according to claim 21, wherein:
the first blade contacting structure comprises a first elongated roller extending in an axial direction between a first axial end and a second axial end, and
the first elongated roller and the blade associated therewith extend parallel to each other, in the axial direction.

23. The apparatus according to claim 22, wherein:
the second blade contacting structure comprises a second elongated roller extending in an axial direction between axial ends thereof and a third elongated roller extending in the axial direction between axial ends thereof, and
the second elongated roller, the third elongated roller, and the blade associated therewith all extend parallel to each other, in the axial direction.

24. The apparatus according to claim 22, wherein:
the second blade contacting structure comprises a curved plate extending in an axial direction between axial ends thereof, and
the curved plate and the blade associated therewith extend parallel to each other, in the axial direction.

25. The apparatus according to claim 21, further comprising an orienting means that is configured and arranged to position the blade with respect to the first blade contacting structure, wherein said orienting means comprises a plurality of spaced through holes formed within said sheet, wherein said through holes are configured and arranged to cooperate with a plurality of projections formed on the first blade contacting structure.

* * * * *